Figure 1:
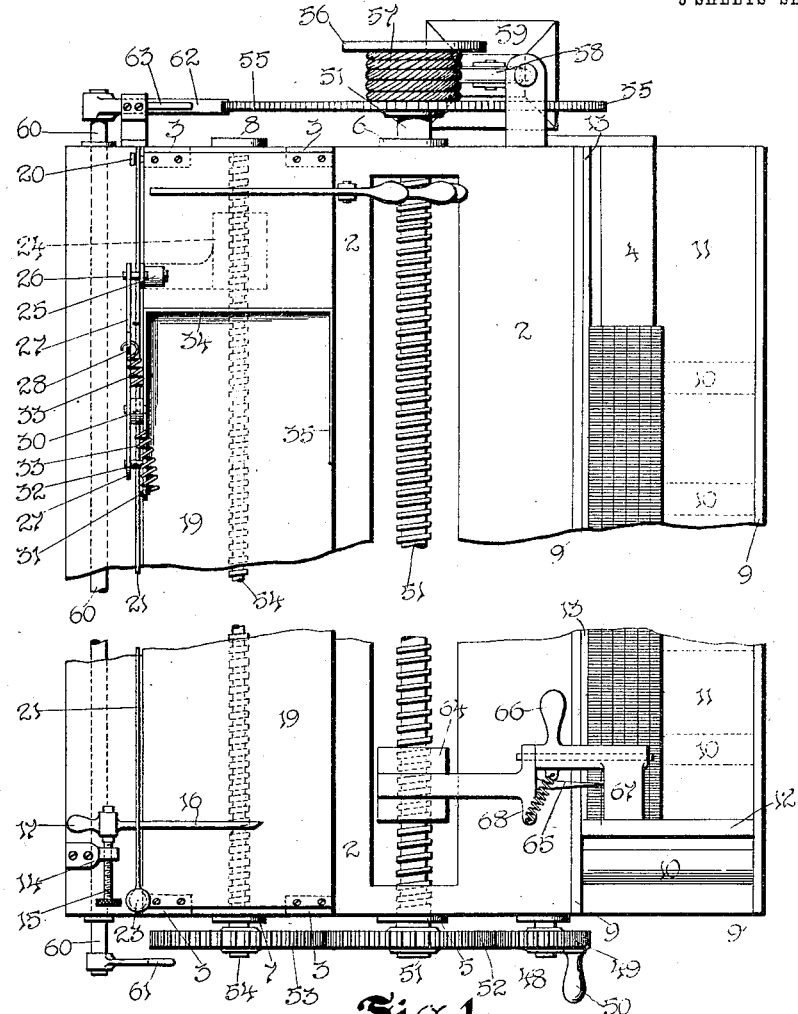

T. BURDEN & E. A. MARTIN.
APPLIANCE FOR INDICATING OR CORRECTING ERRORS IN PRINTERS' GALLEYS.
APPLICATION FILED JAN. 15, 1913.

1,128,221.

Patented Feb. 9, 1915.

5 SHEETS—SHEET 1.

Witnesses: Albert B. Hall
L. E. Witham.

Inventors
Thomas Burden and
Ernest A. Martin
By Arthur E. Dowell
Attorney

T. BURDEN & E. A. MARTIN.
APPLIANCE FOR INDICATING OR CORRECTING ERRORS IN PRINTERS' GALLEYS.
APPLICATION FILED JAN. 15, 1913.
1,128,221. Patented Feb. 9, 1915.
5 SHEETS—SHEET 2.
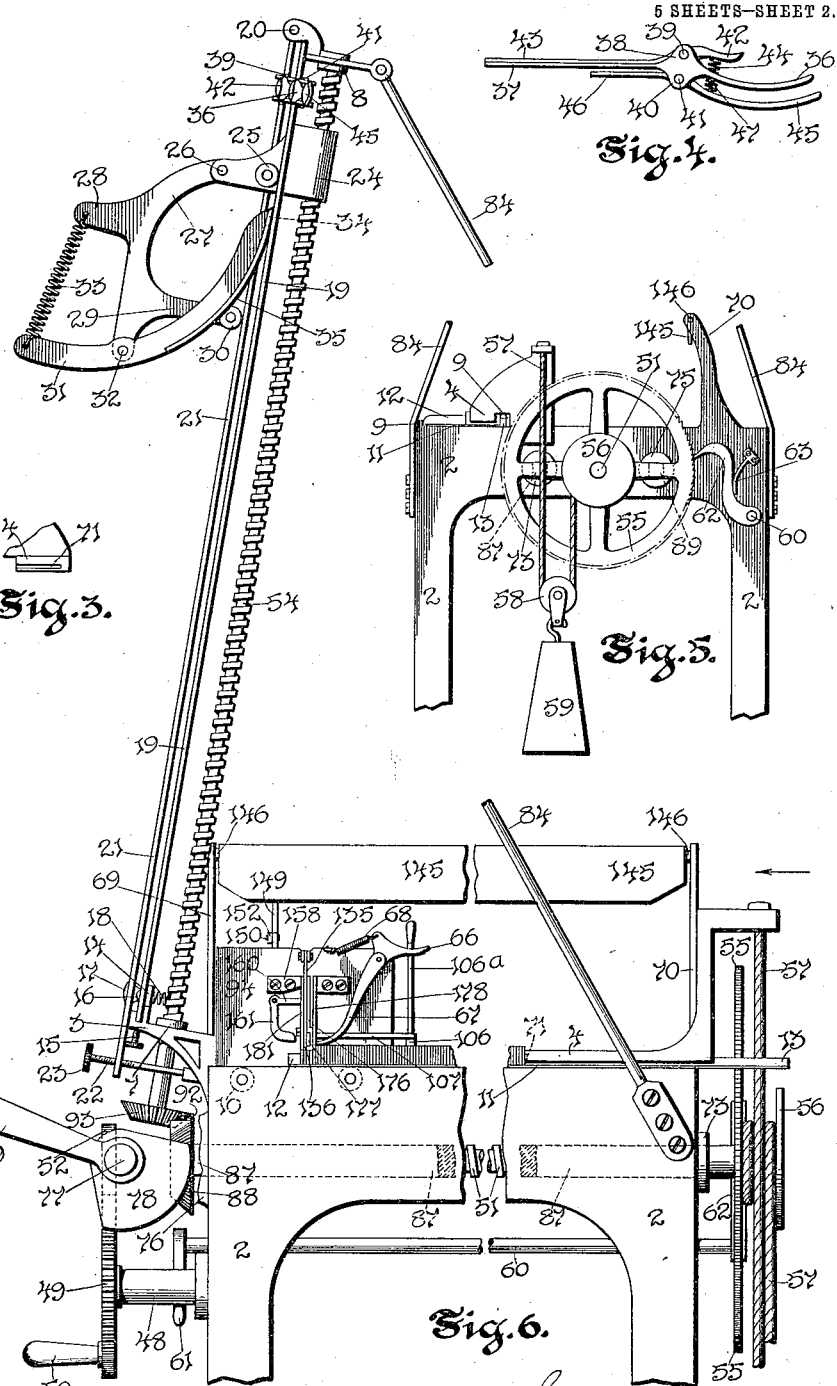

T. BURDEN & E. A. MARTIN.
APPLIANCE FOR INDICATING OR CORRECTING ERRORS IN PRINTERS' GALLEYS.
APPLICATION FILED JAN. 15, 1913.

1,128,221.

Patented Feb. 9, 1915.

5 SHEETS—SHEET 3.

Witnesses: Albert B. Hall
L. E. Witham.

Inventors:
Thomas Burden &
Ernest A. Martin
By Arthur E. Dowell
Attorney

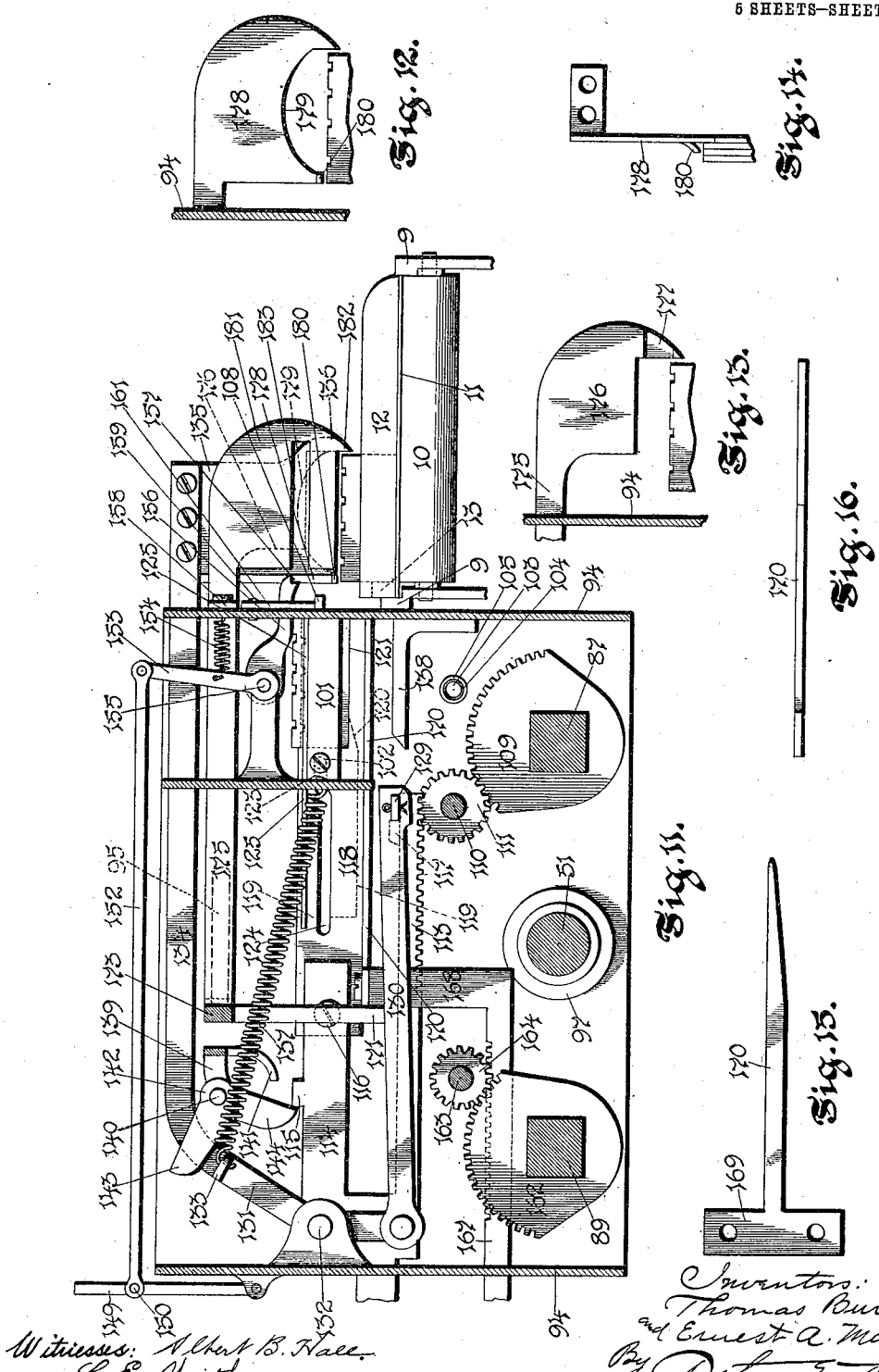

T. BURDEN & E. A. MARTIN.
APPLIANCE FOR INDICATING OR CORRECTING ERRORS IN PRINTERS' GALLEYS.
APPLICATION FILED JAN. 15, 1913.
1,128,221.
Patented Feb. 9, 1915.
5 SHEETS—SHEET 5.
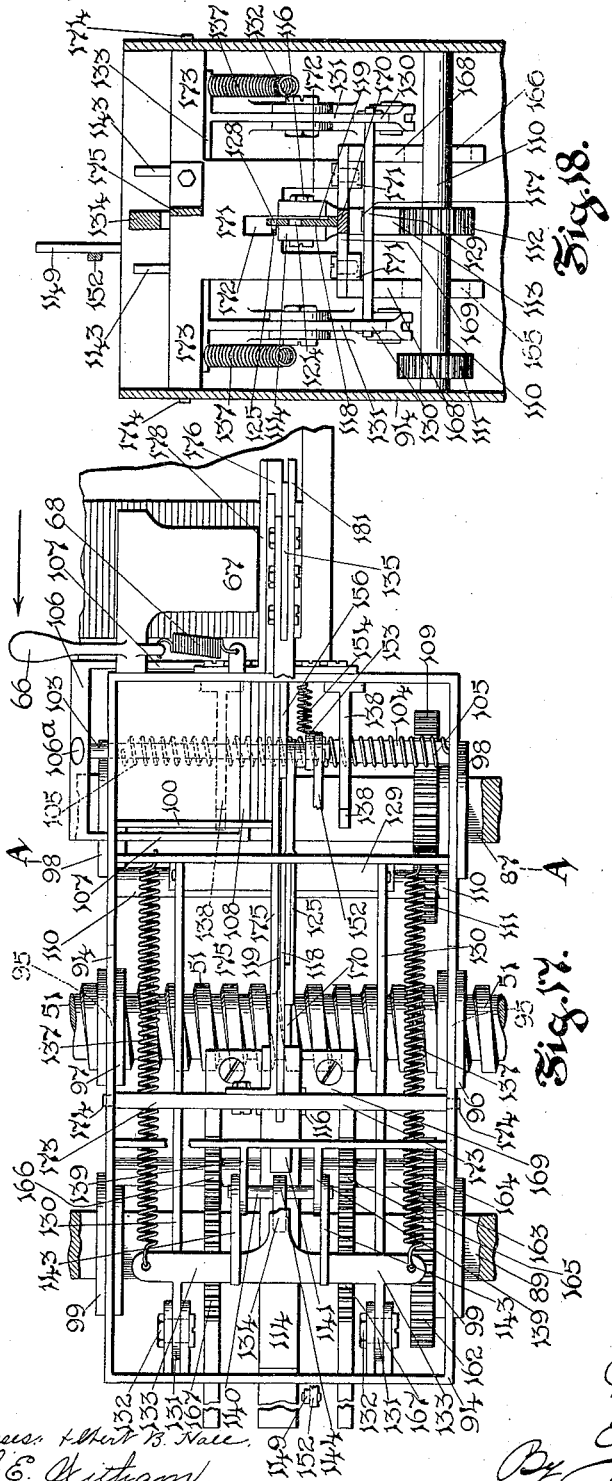
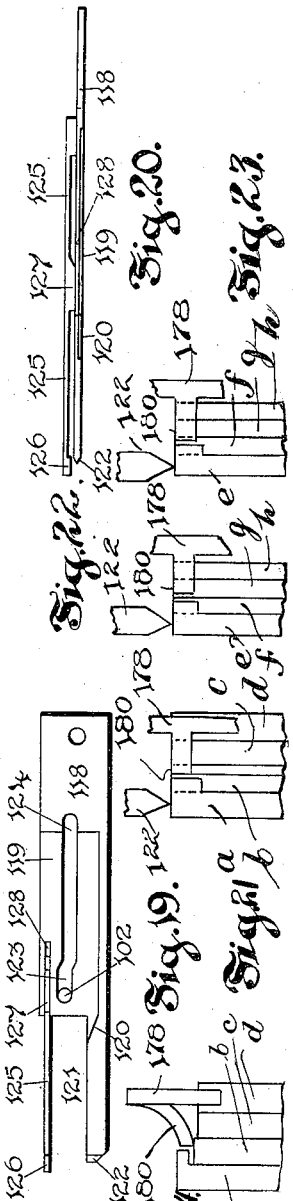

UNITED STATES PATENT OFFICE.

THOMAS BURDEN AND ERNEST ABBOTT MARTIN, OF WARRNAMBOOL, VICTORIA, AUSTRALIA.

APPLIANCE FOR INDICATING OR CORRECTING ERRORS IN PRINTERS' GALLEYS.

1,128,221.  Specification of Letters Patent.  Patented Feb. 9, 1915.

Application filed January 15, 1913. Serial No. 742,222.

*To all whom it may concern:*

Be it known that we, THOMAS BURDEN, a subject of the King of Great Britain and Ireland, and a resident of Henna street, in the town of Warrnambool, county of Villiers, State of Victoria, Commonwealth of Australia, and ERNEST ABBOTT MARTIN, a subject of the King of Great Britain and Ireland, and a resident of Victoria street, in the town of Warrnambool, county of Villiers, State of Victoria, Commonwealth of Australia, have invented a certain new and useful Appliance for Indicating or Correcting Errors in Printers' Galleys, of which the following is a specification.

In the art of printing there are two classes of metal type employed, that consisting of individual letters or characters set by hand and that cast in lines or slugs by machine. After the type has been set up, it is usual to strike off an impression or proof from the galley, to check the proof for errors, and then to correct in the galley the errors indicated on the proof. The operator, when correcting, places the proof showing the errors alongside the galley and reads the proof and the metal type line by line, removing the incorrect matter from the galley and substituting correct type by hand. At present, so far as correcting the galley is concerned, it is immaterial whether the type has been set entirely by hand or whether machine cast type has been used.

Great loss of time and labor results through correcting a galley as above. It is unreliable, as further mistakes may be made, and the eyes are severely strained by reading the metallic embossments. The sight of an operator often eventually becomes so affected through continuous reading of metal type that this branch of employment cannot be further followed.

The object of this invention is to dispense with the necessity of reading the metal type and thus to positively avoid eye-sight strain. It provides for the correction of hand set and machine set type effecting a saving of both time and labor in each instance, and also securing greater accuracy. By the invention the corrected proof sheet only is read the positions of the corrected errors thereon being successively indicated in the galley.

The invention consists in the use of means moving adjacent the proof and in synchronously moving means adjacent the galley so that when a correction or error upon the proof sheet is located by the moving means thereof the corresponding line is simultaneously located in the galley. Particularly when the type is hand set, both means may merely comprise two synchronously moving indicators but in the case of line casting machine matter the invention may also consist in slug operating devices whereby the incorrect line or slug is ejected and a correct one substituted therefor. Provision is then also made for operating upon a slug having therein a "two line" or double width letter, for ejecting a line without replacing it with a new one, for inserting extra lines, and for transposing lines.

In the annexed drawings two illustrative embodiments of the invention have been shown. The first is particularly for use in correcting hand set matter although not limited thereto, and the second is for use in correcting line cast matter. Both arrangements include the same fundamental and novel features *i. e.* indicating errors in the galley, with the object mainly of avoiding the reading of the said galley. Hand set matter it is thought may be rectified quicker by hand whereas in line cast machine matter it is considered advantageous to rectify the galley by mechanical means.

Figure 2:
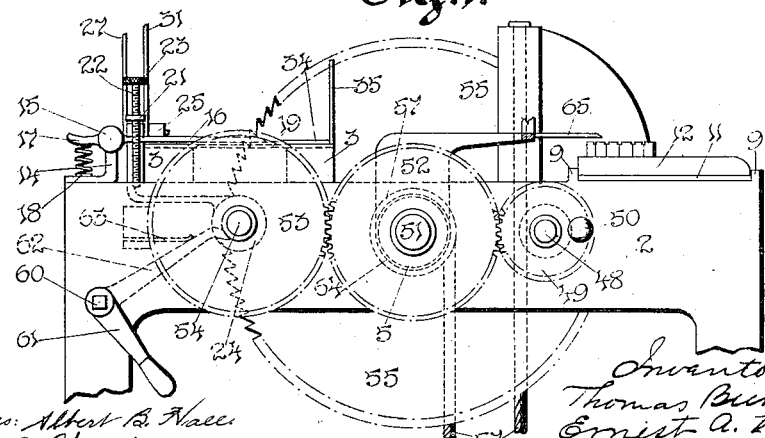
Figure 7:
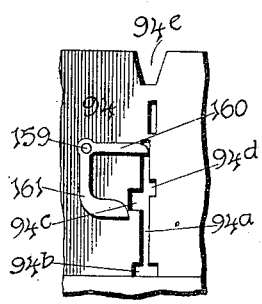
Figure 8:
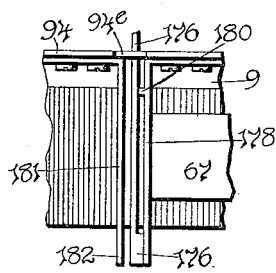
Figure 9:
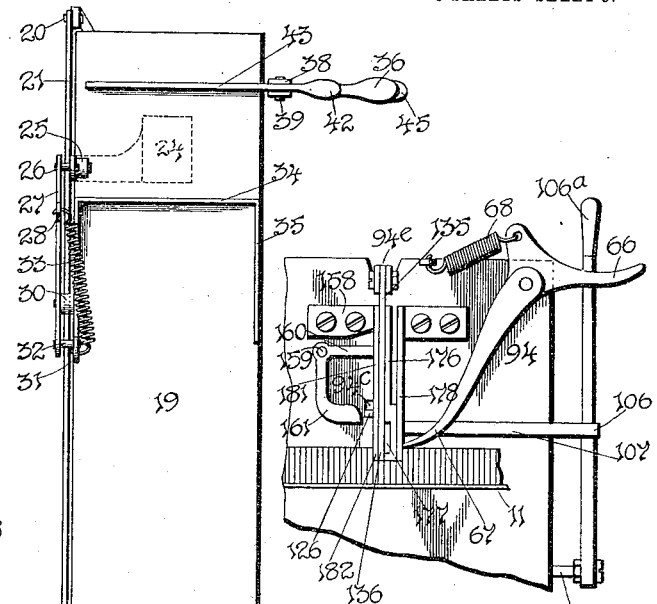
Figure 10:
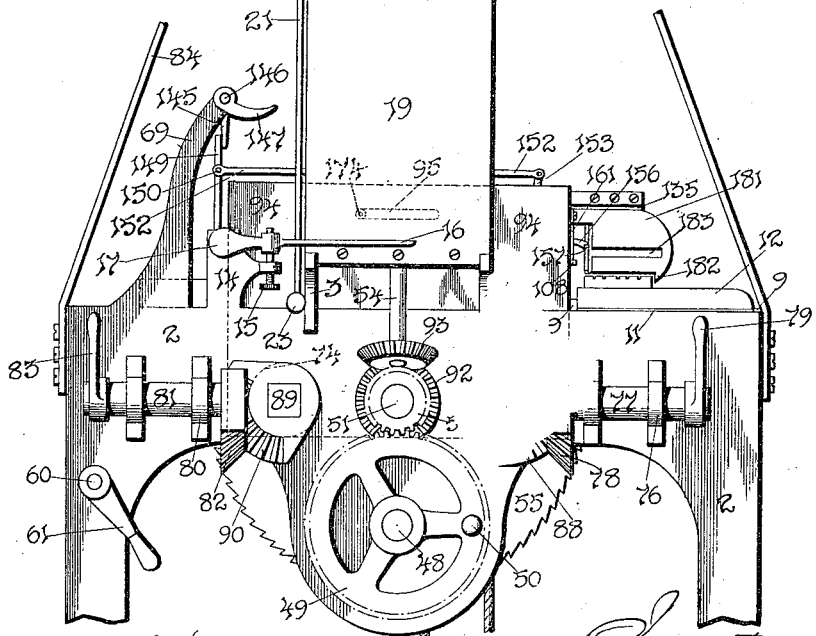

In the drawings:—Figure 1 shows a plan of this invention in a form particularly adapted for indicating errors in hand set matter. Portions have been broken away or removed for convenience of illustration. Fig. 2 is a front view of Fig. 1, portions being broken away and omitted for convenience of illustration. Fig. 3 is an end view of a galley stop looking from the front of the appliance. Fig. 4 is a view of a proof holder by which a proof is retained in position. Fig. 5 is a rear end elevation showing returning means and looking in the direction of the arrow seen in Fig. 6. Portions have been omitted and broken away for convenience of illustration. Fig. 6 is a side elevation of this invention adapted to correct machine line cast matter. Portions have been broken away or removed for convenience of illustration. Fig. 7 is an enlarged side view of portion of the right hand side of a carriage. Fig. 8 is an enlarged plan showing portion of the right side of the carriage and fixed slug retainers secured thereto. Fig. 9 is an enlarged side elevation showing portion of the right side of the carriage and devices carried by the said carriage. Fig. 10 is a front view of this invention adapted to correct machine line cast matter. Portions have been broken away or removed for convenience of illustration. Fig. 11 is an enlarged part sectional front view of a carriage and mechanism carried thereby. Portions have been broken away or omitted for convenience of illustration. Fig. 12 is an enlarged end view of a first fixed slug retainer. Fig. 13 is an enlarged end view of a slug returning device operating in conjunction with a spacer bar. Fig. 14 is a side view of Fig. 12. Fig. 15 is a plan of a spacer bar. Fig. 16 is a side elevation of Fig. 15. Fig. 17 is an enlarged plan of the carriage and mechanism carried thereby. Portions have been broken away or removed for convenience of illustration. Fig. 18 is a sectional view taken approximately on line A—A Fig. 17, looking in the direction of the arrow. Fig. 19 is a view of the slug box side of an ejector. Fig. 20 is a plan of Fig. 19. Figs. 21, 22, 23 and 24 are diagrammatic views showing the adjustment of the proof and ejector when operating on different sizes of type.

Referring to the drawings it will be seen that the invention includes (Figs. 1, 2, 6, and 10) a framework 2 of any suitable character provided with proof stand brackets 3. Projecting from the right hand side of the framework, near or at the rear thereof, is a galley stop 4.

Mounted in or attached to the front of the framework is a middle front bearing 5 and mounted in or attached to the rear of the framework is a corresponding middle rear bearing 6, accommodating a first threaded shaft hereinafter described. There is also provided a first bearing 7 for a second threaded shaft, hereinafter described, and a second bearing 8 for the said second threaded shaft.

Extending along the right hand side of the framework are two galley guides 9. Extending or mounted between the galley guides is a series of rollers 10. Accommodated between the guides and upon the rollers is a slug carrier. This consists of a bottom 11 upstanding above which is a cross front end 12 and a longitudinal left side 13. The right side and the rear end of the carrier are open. Its bottom 11 and left side 13 are capable of passing beneath the galley stop 4. Slugs placed upon the carrier cannot pass the stop 4 as will be hereinafter understood.

Secured to or integral with the framework at the front thereof is a bracket 14 having therein a threaded hole. Accommodated within the hole is a screw 15 having a head at its one end and a plain portion at its other. Intermediately pivoted to the plain portion of the screw 15 is a pointer arm or finger having a proof end 16 and a finger end 17. Beneath the finger end is situated a spring 18.

Carried by the proof stand brackets 3 is a proof support consisting of a plate 19. Pivoted by a pivot pin 20 at one end of the said plate is one end of a guide bar 21 the other end of which is provided with a threaded hole. Accommodated within the threaded hole is a screw 22 having a head 23 at its one end and bearing at its other end or point against the framework. The framework may be recessed to accommodate the screw point. The screw 22 regulates the angle of the guide bar 21 with the plate 19 to increase or reduce the movement of the bridging piece of an indicating frame hereinafter described, for the purpose hereinafter explained.

With the proof support is used a line indicating gear consisting of a nut member 24 having therein a threaded hole. Carried by the nut member 24 is a friction guide roller 25. Pivoted to the nut member, by a pivot pin 26, is one end of a lever 27 having a spring lug 28 and a roller arm 29. Mounted upon a stud protruding from the roller arm is a friction roller 30. This bears upon the guide bar 21 aforedescribed.

With the stand and forming part of the indicating gear is used an indicating frame. This consists of a left side member 31 intermediately pivoted by a pivot pin 32 to the other end of the lever 27. Secured to one end of the left side member 31 is one end of a spiral or other spring 33 the other end of which is secured to the spring lug 28. Integral with the left side member 31 is a cross bridging piece 34. Integral with the bridging piece 34 is a right side member 35.

With the proof support is used (Fig. 4) a proof holder consisting of a clip having an intermediate arm provided with a finger end 36 and a proof end 37. Protruding from the arm at the finger end thereof are two upper lugs 38 between which extends an upper pivot pin 39. Protruding from the arm at the finger end thereof are also two lower lugs 40 between which extends a lower pivot pin 41. Intermediately pivoted by the pivot pin 39 is an upper arm having a finger end 42 and a proof end 43. Between the finger end 42 of the upper arm and the finger end 36 of the intermediate arm is situated an upper spiral or other spring 44. Intermediately pivoted to the pivot pin 41 is a lower arm having a finger end 45 and a support end 46. Situated between the finger end 36 of the intermediate arm and the finger end 45 of the lower arm is a lower spiral or other spring 47.

The proof holder is retained to the plate 19 by the tension of the spring 47 which forces the support end 46 of the lower pivoted arm against the plate 19, thereby clamping the plate between the said support end 46 and the proof end 37 of the intermediate arm of the clip. In the same way, by reason of the spring 44, the upper end of the proof is gripped between the proof ends 37 and 43 of the intermediate and upper arms of the clip.

Mounted in a suitable bearing or bearings carried by the front of the framework is a driving shaft 48 having secured thereon a first toothed wheel 49 projecting from which is a handle 50. Mounted in the middle front and rear bearings 5 and 6 is a first threaded shaft 51 having secured thereon a second toothed wheel 52. Engaging (Figs. 1 and 2) the second toothed wheel 52 in the first embodiment of the invention, is a third toothed wheel 53 secured upon a second threaded shaft 54. The shaft 54 is mounted in the bearings 7 and 8 before mentioned. Upon the second threaded shaft 54 may be a thrust collar or collars. The shaft 54 passes through the nut member 24 of the line indicator gear.

Secured (Fig. 5) to the first threaded shaft 51 is a ratchet wheel 55 having a flanged boss or drum 56. Secured to the drum 56 is one end of a line or cord 57 the other end of which is secured to any suitable portion of the framework. Supported by the line or cord 57 is a pulley 58 carrying a balance weight 59.

Mounted in the framework, preferably at the left hand side thereof, is a longitudinal spindle 60. Attached to the front end of the spindle is a hand lever 61. Attached to the rear end of the spindle is a pawl 62 controlled by a spring 63 and engaging the ratchet wheel 55. By the pawl 62 and ratchet wheel 55 the threaded shafts are prevented from inadvertently rotating.

Accommodated (Figs. 1 and 2) upon the first threaded shaft 51, in the first embodiment of the invention, is a galley indicator consisting of a nut member 64 having a finger or pointer 65 protruding therefrom. Projecting from the indicator is a stud or pivot pin mounted upon which is a galley slug compressor lever having a finger portion 66, and a bearing portion 67. Controlling the galley slug compressor lever is a spiral spring 68 one end of which is secured to the said lever and the other to the galley indicator.

In the second embodiment of the invention the general characteristics of the first embodiment are retained but additional mechanism is introduced to rectify the galley. The framework 2 is now provided with a left front upright 69 and a left rear upright 70. The proof support and second threaded shaft are arranged in an upright position. The galley stop 4 is (Fig. 3) also provided with a slotway 71 to accommodate a spacer bar, hereinafter described, when the last line of the galley has to be operated upon by said bar, or when extra or additional lines have to be added after the last line in the galley, as will be hereinafter understood. In addition, a right front bearing 72 is attached to or mounted in the front of the framework. Attached to or mounted in the rear of the framework is also a corresponding right rear bearing 73. Attached to or mounted in the front of the framework is a left front bearing 74. Attached to or mounted in the rear of the framework is a corresponding left rear bearing 75.

Attached to the front of the framework, in the second embodiment, is (Fig. 10) a right cross shaft bearing or bearings 76 in which is mounted a right cross shaft 77. Secured to the inner end of the cross shaft 77 is a right first bevel segment 78. Secured to the outer end of the cross shaft 77 is a right hand lever 79. Attached to the front of the framework 2 is also a left cross shaft bearing or bearings 80 in which is mounted a left cross shaft 81. Secured to the inner end of the cross shaft 81 is a left first bevel segment 82. Secured to the outer end of the cross shaft 81 is a left hand lever 83. It will be seen that the plate 19 of the proof support is maintained in an upright and slightly inclined position by diagonal stays 84 extending between it and the framework 2.

Mounted in the front right and rear bearings 72 and 73 of the framework is a right square sectioned guide bar 87 having attached to its front end a right first bevel segment 88. Mounted in the left front and rear bearings 74 and 75 of the framework is a left square sectioned guide bar 89 having secured to its front end a left first bevel segment 90. The right bevel segment 88 engages the right bevel segment 78 and the left bevel segment 90 engages the left bevel segment 82.

Mounted, in the embodiment now being described, upon the first threaded shaft 51 is a first bevel wheel 92. This engages a second bevel wheel 93 mounted upon the second threaded shaft 54. The bevel wheels are substituted for the third toothed wheel 53 in the first embodiment.

Moving longitudinally from the front to the rear of the framework, in lieu of the galley indicator before described, (Figs. 6, 10, 11, 17 and 18) is a carriage 94. This may be of any desired character and is preferably of box form. It may be wholly or partially closed in any suitable manner to exclude dust and the like. Formed (Fig. 7) in the right hand side of the carriage 94 is a slug slot way 94$^a$ having at its bottom a spacer bar enlargement 94$^b$ and at one side an ejector spring recess 94$^c$ and at the other side a "two line" slug recess 94$^d$. Above the slotway 94$^a$ is a depressor recess 94$^e$. The galley compressor lever before described is pivoted to the carriage right hand side, as shown. Formed in the front and rear end of the carriage is a slot indicated at 95. Carried by the carriage is a front nut 96 and a rear nut 97 accommodating the first threaded shaft 51. Also carried by the carriage are front and rear right guides 98 and front and rear left guides 99. These are capable of rotation. The right guides accommodate the right square sectioned guide bar 87 and the left guides accommodate the left square sectioned guide bar 89. Within the carriage preferably at the rear right hand corner thereof is a slug box 100 having an open front. Projecting across the front (Fig. 11) is a wall 101. Protruding from the wall is a stud upon which is mounted a friction roller 102.

With the slug box (Fig. 17) is used a slug holder consisting of a rod 103 extending longitudinally beneath the slug box. Protruding inwardly from the front of the carriage is a guide tube 104. The front of the rod telescopes within the said tube. Encircling the guide tube and secured at one end to the wall of the carriage and at the other end to the rod 103 is a spring 105. Secured at the rear end of the rod 103 is the bridge member 106 of a yoke. Projecting from the bridge member 106 may be a hand lever 106$^a$. Extending between the legs 107 of the yoke, at the front end thereof, is a presser plate 108. This passes through the slug box and is controlled by the spiral spring 105. The walls of the box may be slotted to pass the said presser plate 108.

Mounted (Figs. 11, 17 and 18) loosely upon the right square sectioned guide bar 87 and accommodated within the carriage is a right toothed sector 109. Mounted in the carriage adjacent the sector is a right spindle 110 having secured thereon a right toothed pinion 111. Also mounted upon the spindle is an intermediate toothed pinion 112. Engaging the intermediate toothed pinion is a rack 113 having an upstanding integral arm 114. Projecting from the arm is a stop 115 and carried by the said arm, at its inner end, is a pivot pin 116. Upstanding above the rack is a stop 117.

Pivoted to the arm 114 of the rack, by the pivot pin 116 thereof, is (Figs. 19 and 20) a slug ejector and carrier 118. Formed in the ejector is an inner slug recess 119 the bottom of which is level with the bottom of the slug box. At its outer or right hand side the said recess is provided with an upwardly inclined edge 120. Adjoining and in communication with the inner recess is an outer slug recess 121, the bottom of which is above the bottom of the slug box and the inner recess 119. The outer or right hand end of the ejector may be pointed as at 122.

Formed in the ejector above the inner recess 119 is a guide slot having an upper end 123 and a lower end 124. The guide slot accommodates the friction roller 102 mounted upon the wall 101 adjoining the open front of the slug box. Secured to the ejector is a plate spring 125 provided with a catch 126 at its outer end. The spring is also provided with a wedge portion 127 engaging in a spring passageway 128 formed in the said ejector. The plate spring is secured at its inner end to or near to the inner end of the ejector.

Extending across the rack 113 is a cross piece 129. Pivotally connected to each end of the cross piece is one end of a side member 130. Pivoted (Figs. 11, 17 and 18) by a pivot pin to the other end of each side member is the lower end of a depending arm 131. Each depending arm 131 is intermediately pivoted by a pivot pin 132 to the carriage. Extending between the depending arms 131 is a bridge piece 133. Integral with the bridge piece is a longitudinal arm 134. Secured to the outer end of the longitudinal arm, outside of the carriage, is a slug depressor 135. Integral with the slug depressor is a retention stop 136. Secured at each end of the bridge piece 133 is one end of a spiral spring 137. The other end of each spring is secured to the carriage. Projecting inwardly from the carriage toward the rack 113 and toward the cross piece 129 is a pair of trippers or stops 138. Protruding from the carriage, (Figs. 11 and 17) adjacent the bridge piece 133, are two lugs 139 extending between which is a cross pin 140. Below the lugs is a limit stop 141. Secured to the cross pin 140 is a tumbler 142 having two upper arms 143 and a lower arm 144.

Extending between the uprights 69 and 70 is (Figs. 6, 10, and 11) a longitudinal deflector 145 provided with trunnions 146 by which it is pivotally mounted between the uprights. Secured to the front end of the deflector is a finger lever 147. Pivoted by a pivot pin to the left hand side of the carriage is the lower end of a vertical lever 149 the upper end of which engages the deflector 145. The lever 149 is always in engagement with the deflector 145. Pivoted by a pivot pin 150 to the vertical lever 149 is the outer end of a link 152. Pivoted by a pivot pin to the inner end of the link 152 is the upper end of a second vertical lever 153. Secured to the second lever 153 is one end of a spiral or other spring 154 the other end of which is secured to the carriage. The lower end of the second lever is secured to a rocking pin 155 carried by the carriage.

Secured to the rocking pin 155 is the inner end of a holding lever 156 formed in the outer end of which is a slug recess indicated at 157. Secured to the right side or wall of the carriage, adjacent the holding lever 156, is a limit stop 158. Pivoted (Fig. 7) by a pivot pin 159 to the said carriage, below the limit stop 158, is a crank lever the upper arm 160 of which projects above or across the holding lever 156 and the lower angle arm 161 of which adjoins the spring recess 94c formed in the right hand side of the carriage.

Loosely mounted upon the left square sectional guide bar 89 and accommodated within the carriage is (Figs. 11 and 17) a left toothed sector 162. Mounted in the carriage adjacent the left sector 162 is a left spindle 163 having thereon a front toothed pinion 164. Mounted upon the spindle is also an intermediate toothed pinion 165 and a rear left toothed pinion 166. Engaging the intermediate and rear left toothed pinions are two racks 167 each having an upward extension 168.

The extensions are united by the bridging piece 169 (Fig. 15) of a wedged shaped spacer bar 170. This is situated beneath the ejector 118. The width of the spacer bar is equal to the width or thickness of three slugs, as will be hereinafter understood. Secured to or integral with each extension 168 is also the lower end of an upright portion 171. Formed (Fig. 18) in the upright portion is a slotway 172. This accommodates the arm 114 of the rack 113. Integral with the upright portion is a cross piece 173. At each end of the cross piece 173 is a trunnion carrying a friction roller 174. The friction rollers are each accommodated by the slots 95 before described to insure correct alinement and partly to prevent interference with the mechanism within the carriage. Projecting (Fig. 11) from the cross piece 173 is a longitudinal extension 175 having (Fig. 13) at its outer end a depending slug retaining portion 176, provided with a "two line" letter recess 177.

Attached to the right hand side of the carriage above the galley and adjacent the slug slotway 94a formed in the side of the said carriage is (Figs. 8, 9, 12 and 14) a first fixed slug retainer 178 provided with an overhanging archway 179. Outstanding from the retainer is a stop 180. The archway 179 permits of the bearing portion 67 of the galley slug compressor lever being raised to place the galley in position. Protruding from the carriage and adjacent the first fixed retainer 178 is a second fixed retainer 181 having (Figs. 10 and 11) a depending stop 182. Formed in the retainer 181 is a spring passageway 183 to pass the spring 125 when the ejector is operated.

The cycle of operation with this invention, when adapted particularly for the correction of hand set type, is as follows:—

The finger portion 66 of the galley slug compressor lever is depressed the bearing portion 67 being thus raised. The galley consisting of the set up type accommodated upon the slug carrier is placed upon the rollers 10 between the guides 9 and pushed over the rollers until the last slug bears against the galley stop 4. The finger portion 66 is now released. The upper end of a proof printed from the galley and duly corrected is placed between the proof ends 37 and 43 of the upper and intermediate arms of the proof holder. The finger end 17 of the pointer arm is depressed and the proof passed beneath the proof end 16, the plate 19 of the proof stand being then accommodated between the intermediate and lower arms of the proof holder. The proof is moved or adjusted along the plate 19 until the pointer arm is immediately beneath the last line of the proof. Every other line of the proof may now be used to determine the exact position of corresponding galley slugs. Adjustment for various sizes of type may be effected by means of the screw 15 in order that the galley indicator finger 65 will always be in correct alinement with the slugs in the galley. The slight difference between the length of the printed matter of the proof and the length of the column of type in the galley, due to the slugs being more tightly compressed together during printing, may also be rectified by operating the screw 22 of guide bar 21 of the proof stand. The movement of the line indicating gear and the indicating frame thereof is thereby adjusted and the finger 65 is always in alinement with the line of the galley corresponding to that in alinement with the bridging member 34 of the indicating frame. The first toothed wheel 49 by its handle 50 may now be rotated, rotating the first threaded shaft 51 and the second threaded shaft 54. As the shafts rotate the nut members 24 and 64 move along the same synchronously. Immediately the bridging piece 34 reaches a corrected line upon the proof the operator ceases to rotate the handle 50. The line indicated in the galley by the finger or pointer 65 may now be corrected by the said operator.

To return the indicating frame and the finger or pointer 65 the hand lever 61 is operated partially turning the spindle 60 and disengaging the pawl 62 from the ratchet wheel 55. The weight 59 upon the line 57 now causes the drum 56, to which it is attached and around which it is wound, to rotate. This rotates the first threaded shaft 51 in a reverse direction to its former rotation.

When adapted for the correction of line cast machine type the cycle of operations is the same as that described so far as adjustment of the proof and the galley is concerned. The corrected slugs to be substituted in the galley are placed in correct consecutive order in the slug box 100. The presser plate 108 may be moved in the box by means of the handle 106ª. If desired an ink pad and roll of paper may be arranged adjacent the slug box so that the operator may take proofs of the substitute slugs. These proofs may be secured to the plate 19. Upon operation of the handle 50 the bridging piece 34 moves down the proof stand and the carriage moves from the front toward the rear of the framework. When a line standing corrected upon the proof is reached the rotation of the handle 50 is stopped the slug ejector 118 of the carriage 94 being opposite the corresponding line in the galley. The first slug to be substituted is now or has previously been placed in the outer slug recess 121 of the ejector. The bottom of this recess is slightly higher than the bottom of the slug box 100 so that should the slug contain a double width or "two line" letter, being elevated above its fellows, the said slug will not carry another slug with it when moved away from the box. The slug bears against the wall 101 on the one side and is retained by the neighboring slug in the slug box on the other side. The right hand lever 79 may now be depressed partially turning the right square sectioned guide bar 87. By the right toothed sector 109 and toothed pinions 111 and 112 the rack 113, to which the slug ejector 118 is pivoted, is moved outwardly. As the rack moves outwardly its stop 117 engages the cross piece 129 moving the side members 130 outwardly toward the galley. The depending arms 131 now pivot upon the pins 132 thus moving the bridge piece 133 away from the galley and in an opposite direction to the travel of the cross piece 129. The movement continues until the upper arms 143 of the tumbler are free to disengage from the bridge piece 133 and to fall by gravity. Their descent is limited by the engagement of the lower arm 144 with the stop 141. The arms 143 are now below the bridge piece 133. The cross piece 129, when the bridge piece 133 has been raised sufficiently to release the tumbler, encounters the trippers or stops 138 and is raised above and disengaged from the stop 117 of the rack 113. The springs 137 immediately assert themselves and draw the longitudinal arm 134 and slug depressor 135, which have been elevated by the movement of the arms 131, downwardly. The complete descent of the depressor 135 is prevented however by engagement of the bridge piece 133 with the upper arms 143 of the tumbler. The tumbler therefore retains the slug depressor 135 elevated during the continuation of the outward movement of the rack 113 and also during the return movement thereof as will be hereinafter more fully understood.

As the rack 113 moves toward the galley the slug ejector 118 is moved correspondingly carrying with it, in the outer recess 121, the slug to be substituted. The ejector has an unrestricted passage through the slotway 94ª its spring 125 being accommodated by the recess 94ᶜ. The point 122 of the ejector reaches the slug to be ejected from the galley. The ejector, pivoted at 116, is now lifted or elevated from the horizontal plane at its outer end or point 122 by reason of the guide slot moving across the friction roller 102 and the lower end 124 of the said guide slot engaging the said roller 102. This elevating movement occurring with the outward movement of the ejector lifts or tilts the galley slug engaged by the ejector point 122 above its fellows so that if the said slug being ejected contains a double or "two line" letter the adjoining galley slug will not be ejected also. As the ejector continues to move outwardly the inner slug recess 119 moves across the open front of the slug box 100. The slugs in the said box are pressed toward the ejector by the presser plate 108. This is controlled by the spring 105 one end of which is attached to the telescoping rod 103 attached to the yoke of the said presser plate. The next slug in the box 100 is therefore delivered or forced into the inner recess 119. The holding lever 156 bears upon the slug carried by the ejector during its outward movement and falls behind the same when the limit of the travel thereof has been reached accommodating the corner of the slug in the recess 157. The ejector having forced the slug from the galley the right hand lever may be elevated reversing the direction of travel of the ejector and returning the same to its initial position. As the ejector returns it is also lowered to the horizontal plane by the lateral movement of the guide slot across the friction roller 102. The slug accommodated by the inner recess 119 encounters the inclined edge 120 with the inward and descending movement of the ejector and lifts as it encounters the said edge 120. It is pressed against the ejector by the spring 105 but does not retreat with the inner recess 119. It remains laterally immovable and is therefore accommodated by the outer recess 121 when the ejector has returned. It is elevated when in the outer recess 121, above the slugs in the slug box. The slug moved to the galley by the ejector and situated above the space formed by the ejected slug, cannot return with the ejector because of the interposition into its path of movement of the holding lever 156.

As the rack 113 returns inwardly with the elevation of the lever 79 its stop 117 passes beneath the cross piece 129. The stop 115 of the arm 114, however, when the ejector is clear of the galley, engages the lower arm 144 of the tumbler which turns upon the cross pin 140 causing the upper arms 143 to rise until they are free of the bridge piece 133. The springs 137 immediately cause the slug depressor 135 to descend upon the slug situated above the space in the galley. The depressor forces the said slug into position. The arm 134 of the depressor is accommodated in the recess 94$^e$.

The first slug to be substituted, is placed in the outer slug recess 121 by hand. If the slug has been placed in the slug box 100 and has been forced into the inner slug recess 119 it may simply be removed therefrom by hand and placed in the outer recess 121. The withdrawal of the ejector causes the slug occupying the inner slug recess 119 to mount the inclined edge 120 and take its place in the outer slug recess 121. When the ejector is withdrawn into the carriage, recess 119 is unoccupied. As soon as the ejector advances with the slug in recess 121, recess 119 comes opposite the slugs in box 100 and the nearest slug is pushed into it. On the return of the ejector this slug mounts the incline into recess 121 ready to be sent out with the next advance of the ejector, unless of course, it is retained on recess 121 by the operation of the longitudinal deflector 145. In this case the wedge portion 127, Fig. 20, pushes the slug occupying recess 119 back again into the box, the slug in recess 121 not having been discharged into the galley.

When the ejector is lifting a slug in the galley, as hereinbefore described, the slugs at either side thereof are prevented from rising with the same by means of the outstanding stop 180 of the first fixed slug retainer 178 on the one side and the second fixed slug retainer 181 on the other side. The stop 180 only outstands sufficiently to prevent the slug rising but not sufficiently to obstruct a "two line" letter slug when such is being operated upon by the ejector. By adjusting the screw 15 and the pointer arm thereof different sizes of type may be provided for in this connection. The second fixed slug retainer 181 and the depending slug retaining portion 176 retain the substitute slug delivered from the slug box 100 in an upright position after the ejector has returned to its initial position and before and until the depressor 135 descends.

When it is desired to eject a slug from the galley without substituting another slug the longitudinal deflector 145 by its lever 147 is actuated before the hand lever 79 is operated. This moves the vertical lever 149, link 152, and second lever 153 in such a manner as to cause the holding lever 156 to rise. The holding lever is accommodated in the upper portion of the slotway 94$^a$ and as it rises it lifts the upper arm 160 of the crank lever moving the lower angle arm 161 into such a position that it will bear against the spring 125 of the ejector 118 when the latter is moved over the galley. The catch 126 of the said spring is thereby moved behind the slug occupying the outer slug recess 121 and as the ejector is returned carries the said slug therewith the slug pathway being clear of the holding lever 156. As the spring 125 is pressed toward the ejector by the arm 161 of the crank lever the wedge portion 127 moves through the spring passageway 128 into the inner slug recess 119. This presses back and prevents the next slug in the slug box 100 entering the said recess so that when the ejector 118 is returned the slug which occupied the outer recess 121 with the outward movement of the ejector still occupies that recess.

When it is necessary to insert extra or additional slugs or lines in the galley the left hand lever 83 is depressed partially rotating the left square sectioned guide bar 89 which by the left toothed sector 162 and toothed pinions 164, 165, 166, moves the racks 167 and bridge piece 169 toward the galley. The point of the spacer bar 170 moves through the slotway enlargement 94$^b$ to and bears against the galley slug which is next to the galley slug opposite the point of the ejector. This slug is situated between the galley stop and the said slug opposite the point of the ejector. The spacer bar 170 pushes the slug outwardly from the galley for approximately three fourths of the width thereof. On account of its wedge shape it also, as it enters between the galley slugs, forces the said slugs apart. As the galley stop 4 prevents any movement toward the bottom of the galley the whole of the slugs between the top of the galley and the spacer bar move toward the front of the machine. The space created is at least equal to the width of two slugs to provide for the possibility and insertion of a "two line" additional slug. The right hand lever may now be depressed to introduce the additional slug from the slug box 100 to the galley in the manner already described. The left hand lever 83 is elevated to return the spacer bar. As the racks 167 and bridge piece 169 return, the depending slug retaining portion 176 which has moved outwardly with them and with the slug partially forced from the galley also returns and carries the said slug back to position in the galley. It should be mentioned that the depending portion 176 is the width of two slugs so that should a slug pushed outward from the galley contain a "two line" letter and consequently carry with it the next adjoining slug both slugs will be returned. The recess 177 permits the ejection of a "two line" letter slug from the galley by the ejector 118. The right hand lever is now elevated to return the ejector as already described.

The first fixed slug retainer 178 and slug depressor 135, which is in its normal position during the outward movement of the spacer bar, retain in position the slugs next to that being displaced by the said spacer bar during such outward movement thereof.

Should it be necessary to remove a slug or line following a "two line" letter slug, the slug to be removed being situated between the "two line" slug and the galley stop 4, the bridging piece 34 is stopped immediately it reaches on the proof the bottom of the line preceding the one to be removed, that is when the ejector 118 is opposite the "two line" letter slug. The left hand lever 83 is now operated with the result that the spacer bar 170 forms a space between the "two line" slug and the one to be removed. The ejector 118 is now moved to the line to be removed and the right hand lever 79 operated to eject the slug and substitute a correct one.

When lines have inadvertently been transposed in the galley the bridging piece 34 is stopped at the line on the proof which is in an incorrect position. The lever 147 is now operated and then the right hand lever 79 as already described to eject the slug without substituting another. The slug ejected is placed in the outer recess 121 of the ejector 118. The bridging piece 34 is now moved to and stopped at the line immediately below that which the ejected slug is to follow. The left hand lever 83 is now depressed and then the right hand lever 79. The left hand lever 83 is then raised which is followed by the raising of the right hand lever 79 as aforedescribed.

It is not intended that the adjustable pointer arm 16 should be used to make adjustments prior to the correction of each new galley. It is first adjusted so that the machine will operate correctly when the upper edge of the arm 16 is level with the bottom of the last line on the proof and the galley is bearing against the galley stop 4. Another method would be to provide an adjustable galley stop. Usually only one or two sizes of type are used in newspaper and book work, when line casting machines are employed. In such circumstance there would probably be no necessity for using this adjustment. When dealing with three consecutive sizes of type however, non-pareil, minion and brevier for example, the adjustment may be used. The difference in size between the smallest slug (non-pareil) and the largest or thickest slug (brevier) may require the position of the proof to be slightly altered. By moving the pointer the requirement regarding the position of the proof is met. The reason for this comparatively minute alteration is this,—the proof is adjusted so that when the bridging piece 34 is stopped at a line the point of the ejector (122) is opposite the center of the slug to be ejected. Referring to the diagrammatic Figs., 21–24, the position just mentioned is shown in Fig. 21, the slugs representing "brevier" and that indicated (a) being the slug to be ejected, such slug carrying a two-line letter. The stop 180 projects a short distance over slug (b) so that slug (b) will not lift with (a). Should a galley of non-pareil type require correcting the position is as shown in Fig. 22. If the point of the ejector is opposite the center of slug (e) the adjoining slug (f), owing to the non-pareil slugs being narrower than brevier, would probably miss the end of the stop 180. To correct this it is necessary to slightly raise the proof so that when the proof indicator is stopped at a line the ejector will point slightly on one side of the slug (e), Fig. 23. The end of the stop will be correspondingly moved to cover portion of the slug (f). The slight difference between non-pareil and minion or between minion and brevier would enable such consecutive sizes of type to be operated on without this adjustment.

The stop extends over two slugs for the following reason: When the ejecting bar is in operation it has a slight upward movement at a certain point in order to lift a two-line slug (a) sufficiently to enable the two-line letter (i) to clear the top of the adjoining slug (b). The stop 180 is intended to prevent the slug (b) from rising with (a). It is joined to the fixed slug retainer 178. Between this retainer and the slug to be held by stop 180 is the slug (c) over which stop 180 extends. The stop 180 only covers a small portion of the width of slug (b) in order that the said stop will not come into contact with the two-line letter (i) on the slug (a). In Figs. 22 to 24, a, b, c, d, represent brevier slugs, and e, f, g, h, non-pareil slugs.

When a series of corrections have been made to the galley the type therein, which has been passed by the galley indicator or the carriage, would be loose on account of the moving of the type by the operator or because of the extra space made by the use of the spacer bar 170. To prevent the type not corrected also becoming loose the galley slug compressor lever is employed the bearing portion 67 resting upon the type under the influence of the spring 68 and traveling over the same with the galley indicator or carriage. The uncorrected type in the galley is thereby maintained in a compact condition.

When in making a "proof" copy, a roller is moved over the lines of type in a galley, the lines are pressed together by the roller, and as the said roller proceeds from the near to the far end of the galley it follows that the slugs are more tightly pressed at the far end than at the near end, and the "proof" taken has the same defects, although these differences may not always be apparent to a casual observer. When the galley is removed from the machine and placed in our appliance the slugs are in the same condition as before printing the proof sheet. There is therefore a difference between the spaces between the lines of the proof sheet,—which are unequal and gradually closer together,—and the spaces between the lines of the galley,—which are regular and equal. Another reason why the slugs are more tightly compressed when the proof sheet is being printed, than when the galley is being corrected with our appliance is, that during the printing of the proof sheet, the slugs are often locked or held tightly together by various means according to the practice of the operator and the kind of proof press used. This compressing pressure is absent when the galley is on the rollers 10, for, after the galley is pushed in so that the last slug bears hard against the galley stop 4, there is a slight expansion as soon as the hand is taken off the head of the galley, due to the galley being free to move on the rollers. Such expansion is advantageous, inasmuch as it enables a freer movement of the slug ejecting mechanism to be obtained, than if the slugs were held tightly together. All that is necessary for the correct working of the machine is that the slugs shall be in contact with each other in the galley and stand upright. It has been found in actual practice that the variation already referred to is about the width of one slug in a galley of matter, or in other words, the galley of matter on the rollers 10 is about the width of one slug longer than the printed matter on the proof sheet. This being so, if the galley line indicator and the proof line indicator both moved the same distance when the threaded shafts are revolved, the indicator would not point to corresponding lines and the proof line indicator would be pointing to a later line upon the proof sheet than that indicated at the galley. By adjustment of the screw 22 the near or the lower end, as the case may be, of the guide bar 21 is moved, for example, nearer to the plate 19. The bar is then inclined to and not parallel with the plate 19. As the nut 24 moves toward the near or lower end, as the case may be, of the threaded shaft 54, the roller 30 moves down the incline. The arm 29 in consequence approaches the plate 19 as the nut 24 proceeds, the lever 27 pivoting upon the pin 26. The arm 29 carries with it the indicating frame which under the influence of the spring 33 pivots upon the pin 32, the bridging piece 34 thereby gradually receding from the roller 30 and moving nearer the nut 24. Therefore, as the roller 30 progresses along the inclined bar 21, although the movement of the nut 24 in relation to the shaft 54 is necessarily constant, the travel of the bridging piece 34 becomes less and less as the inclination of the guide bar 21 approaches plate 19. The closer the guide bar 21 is to the plate 19 the more restricted is the movement of the bridge piece 34. The inclination is very minute to give a decrease in the movement of the bridging piece of a width of one slug. The bridging piece moves at practically the same speed all the time— that is to say, the speed does not gradually slacken as it moves down the plate 19, but the bridging piece in moving from the top to the bottom of plate 19, travels a total distance of the width of one slug (more or less according to adjustment) less than the total distance traveled by the carriage or slug ejecting mechanism. If there is any gradual slowing down, in case of the lines being closer together at one end of the proof than the other, it is imperceptible in actual practice. Generally the whole galley, when the proof is being printed, is equally compressed along its whole length, although there is a tendency of the roller moving over the type to produce the effect described. It is, however, not sufficient to require any variation in the movement of the bridging piece.

It will be apparent that, as shown in Figs. 1 and 2, the apparatus may be used merely to indicate positions or to enable the operator to readily find lines in the galley without reading the type thereof. The carriage and mechanism is then dispensed with, and the slugs ejected and substituted by hand. Or the ejector could be simply a plain slide used for the purpose of indicating the positions in the galley and also for removing the incorrect lines therefrom, the slug box, spacer bar, and other mechanism being dispensed with. All such modifications and arrangements are considered to be within the scope of the invention and are intended to be covered in the appended claims.

Having now described our invention what we claim as new and desire to secure by Letters Patent is:—

1. In combination, a galley, a proof holder, a line indicator adjusted according to the corrected proof, and means movable with the indicator for ejecting slugs from the galley.

2. In combination, a galley, and means for creating spaces between the slugs in the galley, a proof holder, a line indicator adapted to be adjusted according to the corrected proof at any given point.

3. In combination, a galley, a proof holder, a line indicator adapted to be adjusted according to the corrected proof, means for ejecting slugs from the galley, and means for creating a space between the galley slugs at any given point to permit insertion of a slug.

4. In combination, a galley, means for ejecting slugs from the galley, means for creating a space between slugs at any point in the galley, and means for substituting slugs in the galley for those ejected and for placing slugs in the spaces in the galley.

5. In combination, a galley, a proof holder, a line indicator adapted to be adjusted according to the corrected proof, means for ejecting a slug from the galley and moving a substitute slug opposite the space thus formed in the galley, and means for moving the substitute slug into said space.

6. In combination, a galley, means for ejecting a slug from the galley and moving a substitute slug above the space thus formed in the galley, and means for depressing the substitute slug into said space, means for causing the depressing means to drop when ejecting means move from the galley, and means retaining the slug upright after movement of the ejecting means and before the dropping of the depressing means.

7. In combination, a galley, a proof holder, an indicator adapted to be adjusted according to the corrected proof, means for ejecting slugs from the galley, means for lifting the ejecting means and the galley slug being ejected, and means to prevent adjoining galley slugs rising.

8. In combination, a galley, means for partially ejecting a slug from the galley and forming a space therein, means for introducing an additional slug and means for returning the partially ejected slug to its initial position.

9. In combination, a galley, means for ejecting slugs from the galley and substituting slugs therein, a substitute slug box, means for delivering slugs successively from said box to said substitution means, and means for disposing a slug after delivery to the substitution means at a higher level than the slugs remaining in the box.

10. In combination, a galley, means for ejecting slugs from the galley and substituting slugs for those ejected, means for moving the ejection and substitution means to and from the galley, means for moving into the ejection and substitution means a substitute slug with each movement to the galley, and means for moving the slug in the ejection and substitution means into an elevated feeding position with the movement from the galley.

11. In combination, a galley, a proof support, a proof line indicator adapted to be adjusted according to errors in the proof, and means movable with the indicator for ejecting slugs from the galley.

12. In combination, a galley, a proof support, movable line indicating means, and means adjoining the galley for creating spaces between the slugs thereof at any given point and means for introducing slugs in the spaces.

13. In combination, a galley, a line indicator, means movable with the indicator for ejecting slugs from the galley, means for creating a space between the galley slugs at any given point and means for introducing slugs in the spaces.

14. In combination, a galley, a line indicating means, means moving with the indicating means for ejecting slugs from the galley, means for creating a space at any point in the galley, means for substituting slugs in the galley in place of those ejected, and means whereby slugs may be introduced at any point in the galley.

15. In combination, a galley, a line indicator, means moving with the indicator for ejecting a slug from the galley and moving a substitute slug above the space thus formed in the galley, and means for depressing the substitute slug into said space.

16. In combination, a galley, a line indicator, means moving with the indicator for ejecting a slug from the galley and moving a substitute slug above the space thus formed in the galley, and means for depressing the substitute slug into said space; means for causing the depressing means to drop when ejecting means move from the galley, and means retaining the slug upright after movement of the ejecting means and before the falling of the depressing means.

17. In combination, a galley, a movable line indicator, means moving with the indicator for ejecting slugs from the galley, means for lifting the ejecting means and the galley slug being ejected, and means to prevent adjoining galley slugs from rising.

18. In combination, a galley, a line indicator, means moving with the indicator for partially ejecting a slug from the galley and forming a space therein, means for introducing slugs and means for returning the partially ejected slug to its initial position.

19. In combination, a galley, a line indicator, means moving with the indicator for ejecting slugs from the galley and substituting slugs therein, a substitute slug box, means for delivering slugs successively from said box to said substitution means, and means for disposing a slug after delivery to the substitution means at a higher level than the slugs remaining in the box.

20. In combination, a galley, a line indicator, means moving with the indicator for ejecting slugs from the galley and substituting slugs for those ejected, means for moving the ejection and substitution means to and from the galley, means for moving into the ejection and substitution means a substitute slug with each movement to the galley, and means for moving the slug in the ejection and substitution means into an elevated feeding position with the movement from the galley.

21. In combination, a galley, a line indicator, means for ejecting slugs from the galley and substituting slugs therein, a substitute slug box, means for delivering slugs successively from said box to said substitution means, means for disposing a slug after delivery to the substitution means at a higher level than the slugs remaining in the box, and means to prevent a slug being delivered and to prevent the last slug delivered from being substituted in the galley.

22. In combination, a galley, an ejecting and substitute slug carrying means moving beside said galley; means for providing substitute slugs to the ejecting means; means for preventing the return of a substitute slug with the ejection means; means for disengaging the prevention return means, and means for insuring the return of the substitute slug with the ejecting means.

23. In combination, a galley, means for ejecting a slug from the galley and moving a substitute slug above the space formed in the galley; means interposed in its path to prevent the slug moving from position with the withdrawal of the substitution means, a substitute slug box, means for delivering a slug from said box with each actuation of the substitution means, means to prevent a slug being delivered and preventing the slug last delivered being substituted in the galley, and means for removing the return prevention means from the path of the slug carried by the substitution means and actuating the delivery prevention means.

24. In an appliance for indicating or correcting errors in printers' galleys, a galley and a proof holder, a movable proof line indicating means, and means moving synchronously with the indicating means for ejecting slugs from the galley.

25. In an appliance for indicating or correcting errors in printers' galleys, a galley and a proof holder, a movable proof line indicating means, and synchronously moving means adjoining the galley for creating a space between the slugs thereof at any given point.

26. In an appliance for indicating or correcting errors in printers' galleys, a galley and a proof holder, a movable proof line indicating means, means moving synchronously with the indicating means for ejecting slugs from the galley, and synchronously moving means for creating a space between the galley slugs at any given point.

27. In an appliance for indicating or correcting errors in printers' galleys, a galley and a proof holder, a movable proof line indicating means, means moving synchronously with the indicating means for ejecting slugs from the galley, means for creating a space at any position in the galley, and means for substituting slugs in the galley for those ejected and for placing a slug in any space created in the galley by the spacing means.

28. In an appliance for indicating or correcting errors in printers' galleys, a galley and a proof holder, a movable proof line indicating means, means moving synchronously with the indicating means for ejecting a slug from the galley and moving a substitute slug above the space thus formed in the said galley, and means for depressing the substitute slug into position in said space.

29. In an appliance for indicating or correcting errors in printers' galleys, a galley and a proof holder, a movable proof line indicating means, means movable to and from the galley for ejecting a slug therefrom and providing a substitute slug above the space formed in the galley by the ejecting means, means for depressing the substitute slug into said space, means for lifting the depressing means when the ejecting means moves to the galley, means for causing the depressing means to fall when the ejecting means moves from the galley, and means retaining the slug upright after movement of the ejecting means and before the falling of depressing means.

30. In an appliance for indicating or correcting errors in printers' galleys, a galley and a proof holder, a movable proof line indicating means, means moving synchronously with the indicating means for ejecting slugs from the galley, means for lifting the ejecting means and the galley slug being ejected, and means to prevent adjoining galley slugs from rising.

31. In an appliance for indicating or correcting errors in printers' galleys, a galley and a proof holder, a movable proof line indicating means, means moving synchronously with the indicating means for ejecting slugs from the galley and substituting slugs for those ejected, means for moving the ejection and substitution means to and from the galley, means for moving into the ejection and substitution means a substitute slug with each movement to the galley, and means for moving the slug in the ejection and substitution means into an elevated feeding position with the movement from the galley.

32. In an appliance for indicating or correcting errors in printers' galleys, a galley and a proof holder, a movable proof line indicating means, means moving synchronously with the indicating means for partially ejecting a slug from the galley and forming a space therein, means for inserting slugs and means for returning the partially ejected slug to its initial position.

33. In an appliance for indicating or correcting errors in printers' galleys, a galley and a proof holder, a movable proof line indicating means, means moving synchronously with the indicating means for partially ejecting a slug from the galley and forming a space therein by moving toward the top of the galley all of the type matter between the point of insertion and the said top of the galley, means for retaining the slugs adjoining that partially ejected, and means for returning the partially ejected slug to its initial position.

34. In an appliance for indicating or correcting errors in printers' galleys, a galley and a proof holder, a movable proof line indicating means, means for ejecting slugs from the galley and substituting slugs therein, a substitute slug box, means for delivering slugs successively from said box to said substitution means, and means for disposing a slug after delivery to the substitution means at a higher level than the slugs remaining in the box.

35. In an appliance for indicating or correcting errors in printers' galleys, a galley and a proof holder, a movable proof line indicating means, means moving synchronously with the indicating means for ejecting slugs from the galley and substituting slugs for those ejected, a substitute slug box adjacent the ejecting and substituting means, means for delivering a slug from said box with each actuation of the ejection and substitution means, and means to prevent a slug being delivered and to prevent the slug last delivered from being substituted in the galley.

36. In an appliance for indicating or correcting errors in printers' galleys, a galley and a proof holder, a movable proof line indicating means, an ejecting and substitute slug carrying means moving beside said galley synchronously with the proof line indicating means, means for providing substitute slugs to the ejecting means, means for preventing the return of a substitute slug with the ejection means, means for disengaging the prevention return means, and means for insuring the return of the substitute slug with the ejecting means.

37. In an appliance for indicating or correcting errors in printers' galleys, a galley and a proof holder, a movable proof line indicating means, means moving synchronously with the indicating means for ejecting a slug from the galley and moving a substitute slug above the space formed in the galley, means interposed in its path to prevent the slug moving from position with the withdrawal of the substitution means, a substitute slug box, means for delivering a slug from said box with each actuation of the substitution means, means to prevent a slug being delivered and preventing the slug last delivered being substituted in the galley, and means for removing the return prevention means from the path of the slug carried by the substitution means and actuating the delivery prevention means.

38. In an appliance for indicating or correcting errors in printers' galleys, a framework, an adjustable pointer arm carried by said framework, a proof plate carried by the framework, an adjustable guide bar adjoining said plate, a threaded shaft adjoining said plate, a nut member mounted upon said shaft, a lever pivoted to said nut member bearing upon the guide bar, and a spring controlled indicating frame pivoted to the lever and passing across the proof plate.

39. In an appliance for indicating or correcting errors in printers' galleys, a framework, a galley, a proof sheet holder, first and second threaded shafts rotatable synchronously, a ratchet wheel having a drum secured to the first shaft, a line secured at one end to said drum and at the other end to said framework, a weight supported by said line, a pawl engaging the ratchet wheel and a finger lever controlling said pawl.

40. In an appliance for indicating or correcting errors in printers' galleys, a framework supporting the galley, a proof holder, a first threaded shaft mounted in said framework adjacent said galley, a movable indicator, and a spring controlled galley slug compressor lever moved over the galley by the rotation of said shaft.

41. In an appliance for indicating or correcting errors in printers' galleys, a right guide bar, a lever for partially turning said bar, a rack controlled by said guide bar, an ejector and slug carrier controlled by said rack, a slug depressor operated by said rack, and a tumbler controlling the depressor.

42. In an appliance for indicating or correcting errors in printers' galleys, a framework supporting the galley, a carriage moving in said framework, a slug box in said carriage, a spring controlled presser plate in the slug box, an ejector and slug carrier adjoining said slug box and having an inner slug recess and an outer slug recess in communication with each other, said ejector also having a guide slot, and a friction roller accommodated by said slot.

43. In an appliance for indicating or correcting errors in printers' galleys, a frame work supporting the galley, a carriage moving in said framework, a slug box in said carriage, an ejector and slug carrier adjoining said box and having an inner and an outer slug recess in communication with each other, said ejector having a spring passageway in communication with the inner recess, a plate spring carried by the ejector, a catch and a wedge portion protruding from said spring, a longitudinal deflector, a spring controlled holding lever operated by said deflector, and a crank lever operated by the holding lever and actuating the plate spring.

44. In an appliance for indicating or correcting errors in printers' galleys, a left guide bar, a lever for partially turning said guide bar, racks controlled by said guide bar, a spacer bar controlled by the racks, a longitudinal extension controlled by said racks, and a slug retaining portion depending from said extension.

45. In an appliance for indicating or correcting errors in printers' galleys, a framework, an adjustable indicating frame, a carriage, means for moving or advancing the frame and carriage synchronously, means for returning the frame and carriage, means for compressing the galley slugs until passed by the carriage, an ejector and slug carrier within the carriage, a slug depressor carried by said carriage, means for actuating said ejector and depressor, a slug box within the carriage, means for feeding slugs in said box to the ejector and carrier, means for preventing the slugs being fed, a spacer bar within the carriage, and means for actuating said spacer bar.

46. In an appliance for indicating or correcting errors in printers' galleys, a framework supporting the galley, a right guide bar mounted in said framework, a lever controlling said bar, a left guide bar mounted in said framework, a lever controlling said bar, a slug box in said carriage, an ejector and slug carrier controlled by said right guide bar, a slug depressor controlled by said right guide bar, said ejector having an inner and an outer slug recess in communication with each other, a plate spring carried by the ejector, a deflector pivotally mounted in the framework, a spring controlled holding lever operated by said deflector, a crank lever operated by the holding lever and actuating the plate spring, a first and a second fixed slug retainer carried by the carriage adjacent the ejector, a spacer bar controlled by said left guide bar and a longitudinal extension having a depending slug retaining portion controlled by said left guide bar.

47. Means for correcting composed matter comprising a galley holder, an adjustable proof holder, movable indicating means whereby an error upon the proof sheet is located by said indicating means the point for correction of such error is located in the galley.

48. Mechanism for correcting composed matter comprising a galley holder, a galley proof holder adjacent the galley holder, movable indicating means for the galley holder and the proof holder, and connections between these indicators whereby when an error on the proof is located the corresponding error in the galley is located.

49. Mechanism for correcting composed matter comprising a galley holder, means for holding a proof sheet taken from the galley, movable indicating means for the galley and the proof sheet, and connections between said indicators whereby when a correction or error in the proof sheet is located by its indicator the corresponding point for correction is simultaneously located in the galley.

50. Means for correcting composed matter comprising a galley holder, a proof holder, movable indicating means whereby when a correction or error upon the proof sheet is located by said means the point for such correction or error is simultaneously located in the galley; with means for ejecting an incorrect line or slug, and means for substituting a corrected slug therefor.

51. Mechanism for correcting composed matter comprising a galley holder, a galley proof holder adjacent the galley holder, movable indicating means for the galley holder and the proof holder whereby when an error on the proof is located the corresponding error in the galley is located; with means for ejecting an incorrect line or slug, and means for substituting a corrected slug therefor.

52. Mechanism for correcting errors in composed type matter comprising a galley for holding the composed type, means for holding a proof sheet taken from said type, movable indicating means for the galley and proof sheet, whereby when a correction or error in the proof sheet is located by the indicator the corresponding point for correction is simultaneously located in the galley; with means for ejecting an incorrect line or slug, and means for substituting a corrected slug therefor.

In testimony whereof we affix our signatures in presence of two witnesses.

THOMAS BURDEN.
ERNEST ABBOTT MARTIN.

Witnesses:
HUGH McJENAS,
FREDERICK PERCIVAL JOHNSON.